Sept. 1, 1964  R. H. POSTAL  3,147,149
FUEL CELL CONSTRUCTION
Filed Feb. 27, 1961

*INVENTOR.*
ROBERT H. POSTAL
BY George H. Fritzinger
AGENT

United States Patent Office 3,147,149
Patented Sept. 1, 1964

3,147,149
FUEL CELL CONSTRUCTION
Robert H. Postal, Clifton, N.J., assignor to McGraw-Edison Company, Elgin, Ill., a corporation of Delaware
Filed Feb. 27, 1961, Ser. No. 92,043
1 Claim. (Cl. 136—86)

This invention relates to gaseous fuel cells using a solid electrolyte medium and more particularly it relates to an improved form of such cells employing tubular elements in a rigid concentric arrangement.

The invention relates to all types of gaseous fuel cells whose electrolyte medium remains in the solid state at the operating temperatures of the cells. The phrase "electrolyte medium" as herein employed comprehends both (1) a porous inert solid solid matrix such as of magnesium oxide filled with active electrolyte such as of eutectic alkali carbonates which become molten at the operating temperatures of the fuel cells, and (2) the ion exchange resins of both the mosaic and continuous types. Fuel cells using the first mentioned electrolyte medium are of the so-called high temperature cells operating in a temperature range from 500° C. to 750° C., and those using the second mentioned electrolyte medium are the low temperature cells operating even at room temperatures. Fuels for the high temperature cells comprise the gaseous or vaporized liquid hydrocarbons such as carbon monoxide, methane, propane, natural gas and water gas, and fuels for the low temperature cells comprise hydrogen and alcohols. Typical electrode materials for the high temeprature cells comprise porous sintered nickel and activated iron, and for the low temperature cells comprise porous nickel and copper, or stainless steel, iron or nickel plated with a noble metal such as platinum, paladium, rhodium and iridium, or with platinum or paladium black. For a description of typical electrode and electrolyte medium materials used in the high temperature cell reference may be had to Gorin et al. Patent No. 2,914,596 and for those used in the low temperature cell reference may be had to the Grubb Patent No. 2,913,511.

Heretofore, fuel cells have been made in a clamped arrangement wherein the electrodes in the form of porous plates or of metal screens are applied against opposite sides of electrolyte membranes or plates and are assembled in a stack arrangement with the use of gaskets to provide the necessary seals between the fuel and the oxidant gas sides. These clamped constructions suffer from many structural and operational weaknesses and defects: (1) good electrical contact is difficult to obtain between the electrodes and electrolyte over the entire areas thereof due to the dimensional variations of the components caused by temperature and humidity changes and due to the difficulty in clamped constructions of pressing the electrodes evenly against the electrolyte membranes, (2) the seals are difficult to maintain at the gaskets because of varying temperature and humidity effects and because of corrosive conditions at the high temperatures, and (3) high ionic conductance through the electrolyte membranes is difficult to obtain because the typical electrolyte materials are fragile and must therefore be made relatively thick and/or be mixed with inert binders or reinforcing ingredients when used in plate form. It is to be further noted in these respects that the plate form of electrolyte membrane has a low bursting strength and that in clamped arrangements of such membranes it is difficult to avoid heavy internal thermal or mechanical strains so that here also it becomes necessary to use membranes which are relatively thick or which are reinforced with inert materials else the differential pressure across the membranes must be kept very low to avoid a gas break-through. Such possible gas break-through is particularly to be avoided since it would result in highly explosive gases coming in contact with each other in the presence of a catalyst and of giving rise to an explosive hazard.

An object of the invention is to provide a novel construction of fuel cell using a solid electrolyte which is more economical to build and to maintain than the usual clamped construction.

Another object is to provide such improved fuel cell which has improved durability and life.

Another object is to provide an improved fuel cell construction which has greater mechanical stability and greater ability to withstand thermal and mechanical shock.

Another object is to provide such improved fuel cell which is well nigh leakproof and free of explosive hazards. In this respect a feature of the invention resides in a cell construction which does not require gaskets between the fuel and oxidant gas sides.

Another object is to provide an improved fuel cell of a solid unitary construction which has reduced electrical resistance and enhanced thermal properties.

Aother object is to provide a fuel cell construction which has improved volume and weight efficiency.

Another object is to provide a fuel cell of a concentric design having a power rating which can be preset by choice of the length and diameter of the tubular elements employed.

A still further object is to provide a fuel cell construction which lends itself to mass production techniques.

These and other objects and features of the invention will be apparent from the following description and the appended claim.

In the description of the invention reference is had to the accompanying drawings, of which:

Figure 1:
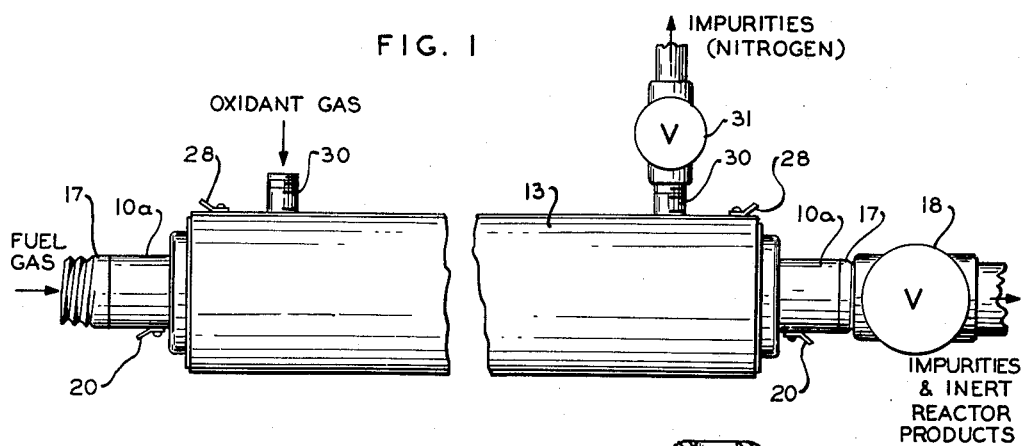
FIGURE 1 is a view partly broken away of a fuel cell construction according to the invention.

The present invention resides in a unique concentric construction of fuel cell which largely overcomes the aforestated difficulties encountered with the clamped constructions heretofore used. The embodiment herein shown to illustrate the invention comprises inner and outer tubular electrodes 10 and 11 in spaced concentric relation with a solid electrolyte medium 12 tightly constricted therebetween. The fabrication of the electrodes and electrolyte into a solid unitary construction may be carried out by coating the inner electrode with a uniform layer of the electrolyte medium, telescoping thereon the outer electrode and then swaging the outer electrode to a reduced diameter while the inner electrode is supported by a collapsible mandrel (not shown). By this means the electrolyte medium becomes solidly locked into position between the electrodes.

Surrounding the outer electrode 11 is a metal sheath 13 held in fixed spaced relationship thereto by a separator in the form of an open wire helix 14. This wire helix breaks the gaseous path 15 along the fuel cell between the outer electrode and the sheath into a helical one increasing the contact of the gases with the outer electrode. Likewise the inner electrode may be provided with a screw-shaped member 16 to give the gases fed thereto a circuitous path.

Preferably the inner electrode is employed as the negative one or anode, and the outer electrode is employed as the positive one or cathode. Accordingly, a fuel gas is fed into the inner electrode and an oxidant gas is fed into the space 15 between the outer electrode and sheath. An advantage of this arrangement is that the outer electrode has a greater contact surface with the gaseous oxidant fed thereto than has the inner electrode with the fuel gas, permitting the oxidant gas to be one such as air wherein the oxygen is mixed with other inert gases.

In a high temperature cell according to the invention the inner negative electrode may, for example, be porous sintered powder of iron, nickel, cobalt or copper, or mixtures thereof, having a powdered metal of the platinum group on its outer surface to enhance catalytic activity. Such outer surface coating may be formed thereon by sintering or by permeating the outer surface of the electrode with a solution containing a metal of the platinum group and then firing and reducing to metallic form. The solid electrolyte medium 12 may comprise a solid inert insulating matrix of porous magnesium oxide impregnated with a mixture of alkali carbonates such as of sodium, potassium and lithium. Preferably, the carbonates are chosen in their eutectic proportion so as to have the lowest possible melting temperature. The outer positive electrode 11 may comprise sintered powdered nickel which is impregnated and sintered on its inner surface with powdered silver to enhance catalytic activity.

In fabricating the high temperature cell a mixture of granular magnesium oxide and of carbonates of sodium, potassium and lithium are extruded onto the negative electrode with the use of a suitable die lubricant and a suitable liquid such as water to maintain the mixture in plastic form. The electrode with the electrolyte coating is then heated to dry the coating thoroughly and to provide it with sufficient mechanical strength so that the coated negative electrode can be telescoped into the positive tubular metal electrode 11. Next as by successive swaging or drawing operations, with the use of a collapsible mandrel supporting the inner negative electrode, the outer positive tubular electrode is reduced to a smaller diameter and contracted thereby tightly onto the solid electrolyte medium 12 to hold it firmly between the electrodes.

Figure 2:
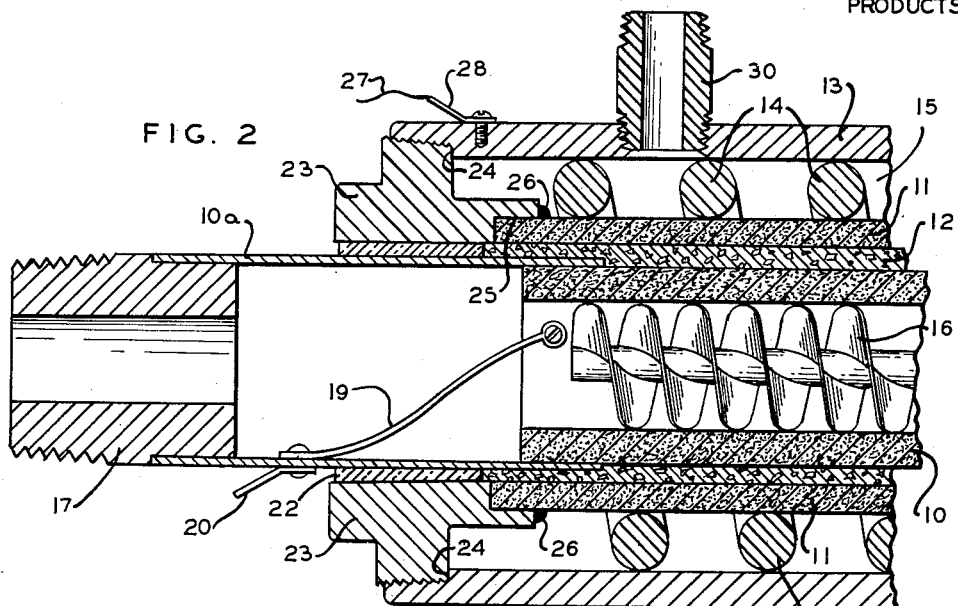
FIGURE 2 is a cross-sectional view of one end portion of the fuel cell showing particularly the end seal, electrical connections and ports for feeding fuel and oxidant gases to the cell.
Figure 3:
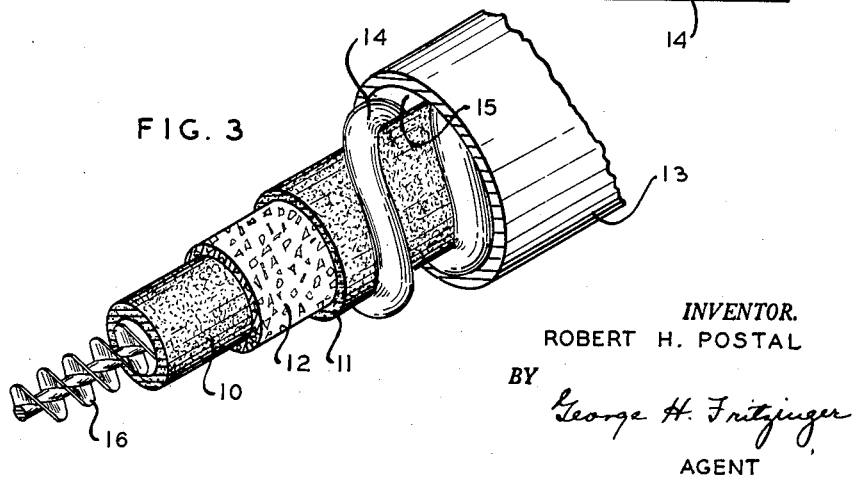
FIGURE 3 is a perspective cut-away view of the fuel cell showing the internal construction thereof.

At each end of the cell the inner negative electrode 10 is provided with a metal tubular extension 10a welded thereto or force fitted thereon. Threaded into these extensions are nipples 17 one of which is to be connected to a source of fuel gas as indicated such as of hydrogen or carbon monoxide. At the other end of the inner negative electrode is a valved outlet 18 to exhaust impurities of the fuel gas or any inert materials which are reaction products of the fuel gas. To assure a positive electrical connection between the negative electrode 10 and the extensions 10a jumper wires 19 are connected between these parts as shown in FIGURE 2. At the points where the jumpers are connected to the extensions 10a there are external electrical terminals 20 to which a source of current may be connected for preheating the negative electrode 10 when the cell is to be started. After the cell is started one, or both of the terminals connected in parallel, is used as a lead out connection for the fuel cell. Surrounding each tubular extension 10a is a ceramic sealing ring 22 embraced tightly by a metal collar 23 which may be threaded or staked tightly into the sheath 13 against an internal shoulder 24. The collar and ceramic ring form an electrically insulating gas-tight seal between the outer sheath 13 and the inner electrode 10. Preferably, the inner end of the collar is counterbored at 25 to embrace an end portion of the positive electrode. A low resistance electrical connection is assured between the collar and positive electrode as by welding the end of the collar thereto as indicated at 26. A terminal 28 is riveted to the sheath 13 to provide a second lead-out connection for the fuel cell. Nipples 30 are threaded through the wall of the sheath 13 near the ends of the fuel cell. Fed into one of these ports is the oxidant gas as indicated and connected to the other port is a valved outlet 31 for the withdrawal of impurities in the oxidant gas. For example, if the oxidant gas is air the outlet 31 is employed chiefly to remove nitrogen which builds up in the space 15 between the outer electrode and sheath.

Preferably, an end portion 12a of the electrolyte medium 12 at each end of the cell comprises merely a magnesium oxide cylinder without being impregnated with active electrolyte material so that each end portion of the fuel cell where the seals and electrical connections are made will be inactive in the operation of the cell. In so doing, the gas ports, seals and electrical connections are confined to inactive end portions of the cell to increase the cell life and stability.

In the low temperature form of the present fuel cell the electrodes may comprise porous sintered metal such as of nickel or copper having their confronting surfaces properly catalyzed with well-known catalytic metals chosen for example from the noble metal group comprising platinum, paladium, rhodium and iridium. The electrolyte medium for this cell comprises preferably the ion exchange resins of either cation or anion type in powder form, for example, in particle size ranging from 300 to 400 mesh. The resin powder is first hydrated by the addition of water and is then extruded onto the inner electrode after which the outer electrode is swaged tightly onto the coated inner electrode to compact the ion exchange resin powder tightly between the two porous electrodes since the ion exchange resin is so compactly held it requires no binders, plasticizers and strengtheners for supporting purposes; also, by this procedure good electrical contact is obtained between the electrolyte medium and the electrodes. The use of pure ion exchange resins without the need for inert strengthening materials provides much higher electrical conductivity than would be the case were the mosaic form required as in the case of the clamped constructions of the prior art. Furthermore, since the present construction permits the ion exchange resin medium to be made very thin the ionic conductance is therefore further increased.

Additionally, the present concentric construction permits the use of high pressure gas feeds without encountering any danger of rupturing the ion exchange resin medium since this medium is securely supported between two porous metal electrodes in a tubular form having maximum strength.

To start the present high temperature fuel cell a low voltage high current source is connected across the end terminals of the fuel electrode 10 for a short period until the active length of the fuel cell is heated by IR heating to the desired operate temperature. Once the cell is brought to this temperature the electrochemical reaction begins and provides its own heat to maintain the fuel cell in operation.

From the foregoing description it will be apparent that the present novel construction of fuel cell has the following advantageous features: (1) the elimination of difficult gaskets between the two gas sides, (2) the provision of a solid unitary construction having maximum strength and permitting the use of thin fragile layers of electrolyte media without encountering a possibility of a breaking or cracking of the electrolyte media from mechanical or thermal shock and without encountering a danger of gas break through such as might give rise to hazardous explosive conditions, (3) the use of electrolyte media with a minimum or absence of inert material giving maximum conductivity and maximum current handling ability, (4) the provision of a solid unitary construction of maximum strength wherein dimensional changes are minimized from temperature and humidity conditions due to the high compressive forces with which the component parts are assembled, (5) the provision of a mechanical design which permits a presetting of the cell capacity by choice of the length and diameter of the cell electrodes, and (6) the provision of an economical construction which lends itself to easy mass production.

The particular construction of fuel cell herein shown and described to illustrate the invention is subject to changes and modifications without departure from the scope of the invention which I endeavor to express according to the following claim.

I claim:

The method of producing a concentric electrode-electrolyte construction for a fuel cell which comprises coating the exterior surface of a tubular electrode with an electrolyte medium comprising a non-sintered granular magnesium oxide matrix impregnated with alkali carbonates, telescoping a second tubular electrode onto said coated electrode, and swaging said second electrode tightly onto said coated electrode while the latter is internally supported.

References Cited in the file of this patent

UNITED STATES PATENTS

| | | |
|---|---|---|
| 2,384,463 | Gunn et al. | Sept. 11, 1945 |
| 2,570,543 | Gorin | Oct. 9, 1951 |
| 2,581,651 | Gorin | Jan. 8, 1952 |
| 2,830,109 | Justi | Apr. 8, 1958 |
| 2,901,523 | Justi | Aug. 25, 1959 |
| 2,901,524 | Gorin | Aug. 25, 1959 |
| 2,980,749 | Broers | Apr. 18, 1961 |
| 3,068,311 | Chambers | Dec. 11, 1962 |

FOREIGN PATENTS

| | | |
|---|---|---|
| 626,768 | Canada | Sept. 5, 1961 |
| 22,393 | Germany | Dec. 16, 1880 |